United States Patent [19]
Hashizume

[11] Patent Number: 5,944,886
[45] Date of Patent: Aug. 31, 1999

[54] COLORED ALUMINIUM PIGMENTS AND THE PREPARATION PROCESS THEREOF

[75] Inventor: Yoshiki Hashizume, Kawachi-Nagano, Japan

[73] Assignee: Toyo Aluminium Kabushiki Kaisha, Japan

[21] Appl. No.: 08/861,687

[22] Filed: May 22, 1997

[30] Foreign Application Priority Data

May 27, 1996 [JP] Japan ................................. 8-132357

[51] Int. Cl.⁶ ............................................ C09C 1/64
[52] U.S. Cl. ...................... 106/404; 106/493; 106/494; 106/495; 106/496; 106/497; 106/498; 106/499; 106/504; 106/505
[58] Field of Search ...................... 106/404, 493, 106/494, 495, 496, 497, 498, 499, 504, 505

[56] References Cited

U.S. PATENT DOCUMENTS

| | | | |
|---|---|---|---|
| 4,976,394 | 12/1990 | Ostertag et al. | 106/404 |
| 5,364,467 | 11/1994 | Schmid et al. | 106/404 |
| 5,401,306 | 3/1995 | Schmid et al. | 106/404 |
| 5,480,481 | 1/1996 | Setoguchi et al. | 106/404 |
| 5,494,512 | 2/1996 | Yamamoto et al. | 106/404 |
| 5,540,768 | 7/1996 | Yamamoto et al. | 106/404 |
| 5,662,738 | 9/1997 | Schmid et al. | 106/404 |

FOREIGN PATENT DOCUMENTS

| | | |
|---|---|---|
| 0 633 297 | 1/1995 | European Pat. Off. . |
| 0 755 986 | 1/1997 | European Pat. Off. . |

OTHER PUBLICATIONS

Derwent Publications Ltd., London, GB; AN 85–107753 XP002070275 & JP 60 051 758, Mar. 23, 1985 (abstract).
Derwent Publications Ltd., London, GB; AN 85–077465 XP002070276 & JP 60 029 401 A, Feb. 14, 1985 (abstract).
Derwent Publications Ltd., London, GB; AN 89–216528 XP002070277 & JP 01 153 761 A, Jun. 15, 1989 (abstract).
Search Report (Jul. 1998).

*Primary Examiner*—Anthony Green
*Attorney, Agent, or Firm*—Nixon & Vanderhye

[57] ABSTRACT

Colored aluminum pigments having a color pigment adhered closely, uniformly and firmly thereto through inorganic acid radical adsorbed on the surface of the aluminum pigment are suitable for use in paints, inks and molded resins. Color fading, poor chroma and processing complications commonly encountered with conventional aluminum pigments are avoided.

8 Claims, No Drawings

COLORED ALUMINIUM PIGMENTS AND THE PREPARATION PROCESS THEREOF

FIELD OF THE INVENTION

The present invention relates to colored aluminium pigments for use in automotive metallic finish, in decoration finish of plastics, in printing inks and the like. The present invention also relates to the preparation process thereof.

BACKGROUND OF THE INVENTION

Aluminium pigments have been commonly used in automotive metallic finish, in decoration finish of plastics, in printing inks and the like. When coloring is desired, color pigments were used together with aluminium pigments. In such cases, it was a problem that a vivid color tone was difficult to obtain by the fact that achromatic tone inherent in aluminium pigment was emphasized. Flake pigments consisting of colored inorganic flaky materials such as mica flake have been also used in place of aluminium pigments. Such flake pigments could give a pearly color tone of their own, but had drawbacks including a small hiding power and a poor metallic luster.

Similar problems arose when aluminium pigments were incorporated into resins to obtain a better decoration effect.

In order to solve the problems as set forth above, several processes have been proposed to obtain a colored aluminium pigment by depositing a color pigment onto the surface of an aluminium pigment with the aid of polymer coating technique (e.g., JP-A-58/141248 and 05/508424, JP-B-94/92546, etc.,). These proposed processes, however, have failed to give a vivid color tone because of the difficulty in depositing a sufficient amount of color pigment on the surface of aluminium pigment. Even though a process succeeded in depositing a sufficient amount of color pigment, other problems such as an easy exfoliation of color pigment, a complicated preparation process and the like have remained.

The main object of the present invention is to provide an aluminium pigment colored to a high chroma by depositing a color pigment on the surface of the aluminium pigment, thereby allowing to improve the defect in chroma inherent in conventional aluminium pigments.

Another object of the present invention is to solve the problems on the coloring of conventional aluminium pigments such as color fading, defect in chroma, complication of preparation process and the like and as a consequent, to provide colored aluminium pigments suitable for use in paints or inks or molded resins.

In order to achieve the objects set forth above, a color pigment must adhere to at least the whole surface of individual particle of aluminium pigment. If there are some particles of aluminium pigment remained uncoated with color pigment, the light directly reflected by these uncoated particles will damage the brightness of color tone. When such colored aluminium pigments are used to prepare paints or inks or molded resins as well, the exfoliation of color pigment may happen in the course of the preparation processes and consequently, the resultant aluminium pigment having a surface uncoated with color pigment may damage the brightness of color tone.

SUMMARY OF THE INVENTION

The colored aluminium pigment of the present invention is characterized by having on the surface of an aluminium pigment an adsorption layer of inorganic acid radical and a color pigment layer adhered to said adsorption layer.

The color pigment layer of the colored aluminium pigment of the present invention is preferably coated with a polymer derived from a polymerizable monomer.

DETAILED EXPLANATION OF THE INVENTION

The colored aluminium pigment of the present invention comprises an adsorption layer of inorganic acid radical on the surface of an aluminium pigment and a color pigment layer adhered to the adsorption layer.

Aluminium pigments which may be used as substrates are preferably in the form of flake having a thickness of 0.1 to 5 microns, average particle diameter of 5 to 100 microns and a shape factor (average particle diameter divided by thickness) of the order of 2 to 100. In addition to these flaky aluminium pigments, particles having a particle diameter of the order of 5 to 1000 microns (preferably 10 to 100 microns) can be used as aluminium pigments. For molded resins, aluminium pigments in the form of flake or particle having a relatively small shape factor (of the order of 2 to 10) may be preferable, since materials having this order of shape factor are free from flowmarks during molding operation.

According to the present invention, it is important to provide an adsorption layer of inorganic acid radical on the surface of aluminium pigment. The adsorption layer of inorganic acid radical is effective in increasing the active sites on the surface of aluminium pigment and hence, in depositing a color pigment easier and at the same time stronger. As a consequent, the color pigment can adhere to the surface of aluminium pigment uniformly and firmly.

Inorganic acid radicals which may be used to be adsorbed on the surface of aluminium pigment are acid radicals of: carbonic acid, boric acid, sulfuric acid, nitric acid, phosphoric acid, phosphorus acid, hypophosphorous acid, silicic acid, chromic acid, molybdic acid, tungstic acid, titanic acid, vanadic acid and tantalic acid as well as the condensates thereof. Particularly preferred acid radicals are those of phosphoric acid, molybdic acid, tungstic acid and vanadic acid as well as the condensates thereof such as pyrophosphoric acid, polyphosphoric acid, polymolybdic acid, polytungstic acid, phosphomolybdic acid and phosphotungstic acid. Polymolybdic acid and polytungstic acid of the present invention include also peroxy polyacids represented by the general formula: $M_xO_y \cdot mH_2O_2 \cdot nH_2O$ wherein M represents Mo or W which are derived from hydrogen peroxide and metallic Mo or W.

Methods for adsorbing inorganic acid radical onto the surface of aluminium pigment are not particularly limited. As a preferred method, an inorganic radical-containing compound such as acid or ammonium salt thereof is dissolved in a hydrophilic solvent such as water or alcohol, the obtained solution is mixed with an aluminium pigment and the resultant mixture is mixed with stirring or kneaded in the state of a slurry or a paste.

The amount of inorganic acid radical adsorbed to the surface of aluminium pigment is preferably 0.05 to 5 parts by weight on the basis of 100 parts by weight of aluminium pigment. With a smaller amount, color pigment cannot sufficiently adhere, whereas with a larger amount, problems such as aggregation of aluminium pigments and the like may arise.

According to the present invention, colored aluminium pigments include a layer of color pigment through an adsorption layer of inorganic acid radical.

Color pigments may be organic or inorganic. Examples thereof are as follows:

phthalocyanine, halogenated phthalocyanine, quinacridone, diketopyrrolopyrrole, isoindolinone, azomethine metallic complex, indanthrone, perylene, perynone, anthraquinone, dioxazine, benzoimidazolone, condensed azo, triphenylmethane, quinophthalone, anthrapyrimidine, titanium oxide, iron oxide, carbon black, navy blue, dark blue, cobalt blue, chrome green.

Among these, particularly preferable color pigments with regard to adhesiveness, weathering resistance and tinting strength are phthalocyanine blue, phthalocyanine green, quinacridone red, quinacridone maroon, quinacridone gold, diketopyrrolopyrrole, isoindolinone yellow, isoindolinone orange, anthrapyrimidine yellow, dioxazine violet, perylene maroon, azomethine copper complex, ultrafine titanium oxide, transparent iron oxide and carbon black.

Color pigments having a primary particle diameter of 0.01 to 1 micron, preferably 0.02 to 0.1 micron can be used.

Suitable loadings of color pigment are in the range of 0.01 to 0.5 g, more preferably 0.03 to 0.3 g per m² of the surface area of aluminium pigment.

With smaller loadings, satisfactory coloring effect cannot be attained, whereas with larger loadings, the color pigment is likely to exfoliate.

When desired, the color pigment which was precoated with an amino compound having 2 amino groups and no carboxylic group in the molecule may be used. When such precoated color pigment is used, the adhesiveness of the color pigment to the aluminium pigment adsorbing inorganic acid radical can be improved.

Examples of amino compounds having 2 amino groups and no carboxylic group are as follows:

ethylenediamine, trimethylenediamine, tetramethylenediamine, pentamethylenediamine, hexamethylenediamine, 1,7-diaminoheptane, 1,8-diaminooctane, 1,10-diaminodecane, 1,12-diaminododecane, o-phenylenediamine, m-phenylenediamine, p-phenylenediamine, 1,8-diaminonaphthalene, 1,2-diaminocyclohexane, stearyl propylenediamine, N-β-(aminoethyl)-γ-aminopropyltrimethoxysilane and N-β-(aminoethyl)-γ-aminopropylmethyldimethoxysilane.

Among these, particularly preferred amino compounds as having an excellent adhesiveness to aluminium pigments adsorbing inorganic acid radical is at least one selected from the group consisting of aliphatic diamine having 6 to 12 of carbon atoms, N-β-(aminoethyl)-γ-aminopropytrimethoxysilane and N-β-(aminoethyl)-γ-aminopropylmethyldimethoxysilane.

Suitable amount of amino compound having 2 amino groups and no carboxylic group is 0.2 to 100 parts by weight, more preferably 0.5 to 50 parts by weight on the basis of 100 parts by weight of color pigment. At too little amount, the color pigment may have the difficulty in adhering to aluminium pigment. On the contrary, too large amount of amino compound may give rise to some disadvantages including that: even though the adhesion of aluminium pigment with color pigment was followed by the polymer coating, the color pigment cannot fix to aluminium pigment enough firmly; when a colored aluminium pigment is formulated into a paint or a coating, superfluous amino compound may arise the problems such as an increased viscosity of paint, a decreased weathering resistance of coating; and the like.

On treating a color pigment with any of the amino compounds above-mentioned, monobasic aromatic carboxylic acid may be additionally used. By additional use of monobasic aromatic carboxylic acid, the color pigment can adhere to aluminium pigments adsorbing inorganic radical with an increased stability.

Examples of monobasic aromatic carboxylic acids are as follows: benzoic acid, vinyl benzoate, salicylic acid, anthranilic acid, m-aminobenzoic acid, p-aminobenzoic acid, 3-amino-4-methylbenzoic acid, p-aminosalicylic acid, 1-naphthoic acid, 2-naphthoic acid, naphthenic acid, 3-amino-2-naphthoic acid, cinnamic acid and aminocinnamic acid.

Among these, those acids which belong to the group consisting of benzoic acid, aminobenzoic acid (e.g., anthranilic acid), aminohydroxybenzoic acid (e.g., aminosalicylic acid), naphthoic acid (e.g., 2-naphthoic acid), aminonaphthoic acid (e.g., 3-amino-2-naphthoic acid), cinnamic acid and aminocinnamic acid are particularly preferred, since these acids can impart to the color pigment an improved adhesiveness to aluminium pigment.

Suitable amount of monobasic aromatic carboxylic acid is 0.2 to 100 parts by weight, more preferably 0.5 to 50 parts by weight on the basis of 100 parts by weight of color pigment. At too little amount, the color pigment is likely to fall off from aluminium pigment. On the contrary, at too large amount, several disadvantages may arise including that: the color pigment cannot fix to aluminium pigment firmly even though the adhesion of color pigment to aluminium pigment is followed by a polymer coating; when a colored aluminium pigment is formulated into a paint or a coating, superfluous monobasic aromatic carboxylic acid may give rise to an decreased weathering resistance of the coating; and the like.

In addition to the compounds set forth above, color pigments may be adhered by pigment dispersants such as surfactants, chelates and the like or UV absorbers.

Color pigments thus treated demonstrate a very good adhesiveness to aluminium pigments adsorbing inorganic acid radicals, thus able to impart vivid colors to each aluminium pigment.

Methods comprising the following steps may be preferably used for adhering a color pigment to aluminium pigments adsorbing inorganic acid radical.

(1) A dispersion of a color pigment in a non-polar solvent is prepared in the presence of an amino compound having 2 amino groups and no carboxylic acid or in the presence of said amino compound and a monobasic aromatic carboxylic acid, optionally with the addition of a pigment dispersing agent such as surfactant or chelate. Suitable non-polar solvents are aliphatic hydrocarbons or aromatic hydrocarbons each having a boiling point in the range of the order of 100 to 250° C. and the mixtures thereof. Examples which may be suitably used are normal paraffin, isoparaffin, toluene, xylene, solvent naphtha, kerosene, mineral spirit, petroleum benzine and the like. A minor amount (of the order of 5% or less) of alcohol or ester solvents may be added as pigment dispersion aids, if necessary.

Methods for dispersing a color pigment in non-polar solvent may preferably be selected from the methods carried out using grinding medium such as ball mill, bead mill, sand mill and the like.

(2) An aluminium pigment adsorbing inorganic acid radical is prepared by dispersing a compound containing the inorganic acid radical in water or a hydrophilic solvent, adding the resultant dispersion to a slurry or a paste containing the aluminium pigment and mixing or kneading the resultant mixture for adsorbing the inorganic acid radical to the surface of the aluminium pigment. In order to homogeneously mix the aluminium pigment and the inorganic acid radical containing dispersion, hydrophilic solvent or surfactant can be added as required. Hydrophilic solvents which may be suitably used include: alcohols such a s ethanol, isopropyl alcohol, isobutyl alcohol, ethylene glycol and the like; polyvalent alcohol derivatives such as ethylene glycol monomethylether, ethylene glycol monobutylether, diethylene glycol dibutylether, propylene glycol monomethylether, methylpropylene glycol monomethylether and the like. Surfactants which may be suitably used include: polyoxyethylene alkylether, polyoxyethylene alkylamine, polyoxyethylene alkylphenolether, polyoxyethylene sorbitan fatty acid ester, alkylbenzenesulfonate and the like.

In order to remove the superfluous water, hydrophilic solvent or surfactant as completely as possible, a slurry of aluminium pigment adsorbing inorganic acid radical is preferably subjected to solid-liquid separation to obtain a paste or a powder (3) The aluminium pigment adsorbing inorganic acid radical prepared in the step (2) is added to the dispersion of color pigment prepared in the step (1) to obtain a dispersion. Preferable dispersing methods include, in addition to the milling with the aid of grinding medium as stated above, the stirring by means of stirrer or disper. Another dispersing method which may be suitably used comprises the steps of: adding an aluminium pigment adsorbing inorganic acid radical to a slurry of color pigment; subjecting the obtained mixture to solid-liquid separation, thereby affording a paste; and kneading the resultant paste in kneader-mixer.

Thus obtained colored aluminium pigment is called as primary colored aluminium pigment. The primary colored aluminium pigment in which a color pigment adheres closely and uniformly to the surface of each particle of aluminium pigment, exhibits a vivid color tone and is excellent in metallic luster.

Adhesion properties of the adhered color pigment can be further improved by coating a color pigment layer with a polymer. In the course of the polymer coating, the polymer penetrates into the gaps between the color pigment and the surface of aluminium pigment and acts as fixing agent, thus improving the adhesion properties. The polymer loadings are suitably 0.5 to 100 parts by weight, more preferably 5 to 30 parts by weight on the basis of 100 parts by weight of colored aluminium pigment. With smaller loadings, adhesive properties cannot be enough, whereas excessive loadings may damage the luster of colored aluminium pigment.

In order to coat the primary colored aluminium pigment with a polymer, a preferable method comprises the steps of dispersing the relevant primary colored aluminium pigment in a solvent consisting of hydrocarbon or alcohol (hydrocarbon solvent is preferred), adding to the resultant dispersion amonomer anda polymerization initiator such as benzoyl peroxide, isobutyl peroxide, azobisisobutyronitrile and the like, stirring under heating to polymerize the monomer and allowing the resultant polymer to precipitate on the surface of the flake. It is desired that the polymerization reaction is carried out in oxygen-free atmosphere, for instance, in the presence of inert gas such as nitrogen, argon and the like. The reaction temperature is suitably 50° C. to 150° C., more preferably 70° C. to 100° C. At the temperature lower than the above range, the polymerization reaction cannot proceed efficiently, whereas at the temperature higher than the above range, the reaction proceeds straight, and hence prevents the polymer from precipitating on the surface of aluminium pigment. The reaction time is preferably of the order of 0.5 to 24 hours. When the reaction time is too short, the monomer cannot polymerize enough, whereas any particular merit cannot be obtained even when the reaction time is prolonged to 24 hours or more.

Suitable monomers which can be used in polymerization are: acrylic acid, methacrylic acid, methyl methacrylate, butyl acrylate, 2-ethylhexyl acrylate, lauryl acrylate, stearyl acrylate, cyclohexyl acrylate, 2-hydroxyethyl acrylate, 2-hydroxybutyl acrylate, 2-methoxyethyl acrylate, 2-diethylaminoethyl acrylate, butyl methacrylate, octyl methacrylate, 1,4-butanediol diacrylate, 1,6-hexanediol diacrylate, 1,9-nonanediol diacrylate, neopentyl glycol diacrylate, tripropylene glycol diacrylate tetraethylene glycol diacrylate, trimethylolpropane triacrylate, tetramethylolmethane tetraacrylate, pentaerythritol triacrylate, trisacryloxyethyl phosphate, ditrimethylolpropane tetraacrylate, styrene, α-methyl styrene, vinyl toluene, divinyl benzene, acrylonitrile, methacrylonitrile, vinyl acetate, vinyl propionate, maleic acid, crotonic acid, itaconic acid, polybutadiene, linseed oil, soybean oil, epoxidized soybean oil, epoxidized polybutadiene, cyclohexene vinyl monoxide and divinyl benzene monoxide.

In order to further improve the resistance to solvent of a colored aluminium pigment coated with any of the above polymers, this pigment may be subjected to another coating with silane coupling agent or titanium coupling agent. For carrying out these coating with coupling agents, there can be used a method comprising the steps of: dispersing an aluminium pigment having a polymer coating in a solvent such as hydrocarbon or alcohol; adding to the resultant dispersion a coupling agent and optionally water; and stirring the resultant mixture under heating to induce the hydrolysis thereof, whereby the coupling agent is allowed to precipitate on the substrate consisting of polymer-coated colored particle, or else, amethod comprising the steps of: mixing a colored aluminium pigment coated with polymer with a solvent to prepare a paste; and adding a coupling agent to the resultant mixture under kneading. The polymer-coated colored aluminium pigment prepared in these methods can be considered to be coated with a silane coupling agent or titanium coupling agent in the hydrolyzed and condensed form.

The colored aluminium pigments of the present invention can be used as resin compositions formulated with paints, inks or molded resins. The "resin compositions" herein used include paints and the coatings made therefrom, inks and the printed matters made thereby, as well as molded resins and the pellets as materials therefor.

The loadings of colored aluminium pigment in the resin compositions are suitably 0.1 to 30% by weight on the basis of the weight of the composition. When the loadings are too little, enough decorative effect cannot be obtained, whereas when the loadings are too much, physical properties (weathering resistance, corrosion resistance, mechanical strength and the like) may be adversely affected.

Paints and inks may be composed of the following ingredients:

1) resins: acrylic resins, alkyd resins, polyester resins, polyurethane resins, polyvinyl acetate resins, nitrocellulose resins, fluorocarbon resins;
2) pigments: in addition to colored flakes of the present invention, color pigments or extender pigments or dyes such as phthalocyanine, quinacridone, isoindorinone, perylene, azorake, ironoxide, chromeyellow, carbon black, titanium oxide, pearl mica and the like may be used in combination;

3) additives: solvents, surfactants, hardeners, uv absorbers, static eliminating agent, thickeners and the like.

Molded resins may be composed of the following ingredients:

1) resins: polyethylene resins, polypropylene resins, polybutadiene resins, polycarbonate resins, ABS resins, polyvinyl chloride resins and the like;
2) pigments: in addition to colored flakes of the present invention, color pigments or extender pigments or dyes such as phthalocyanine, quinacridone, isoindorinone, perylene, azo rake, iron oxide, chrome yellow, carbon black, titanium oxide, pearl mica and the like may be used in combination;
3) additives: coupling agents, plasticizers, hardeners and the like.

Effects of the Invention

According to the present invention, color pigments can adhere closely, uniformly and firmly to the surface of aluminium pigments by means of inorganic acid radical and hence it was made possible to obtain colored aluminium pigments excellent in chroma and resistance to solvent. According to the present invention, a very wide range of color pigments are usable and hence colored aluminium pigments of every color can be obtained.

Further, the inorganic acid radicals adsorbed onto the surface of aluminium pigment are effective in preventing the corrosion of aluminium pigment and further, the polymer coating over the inorganic acid radicals is also corrosion resistant and consequently, pigments of the present invention have an increased chemical stability and can be applied also in aqueous paints. Furthermore, paints formulated with colored aluminium pigments of the present invention are free from the corrosion of aluminium pigments, thus excellent in acid resistance and alkali resistance.

EXAMPLES

Example 1

1) To 11.4 g (10 g in terms of metal content) of commercially available aluminium pigment (fabricated by Toyo Aluminium k.k., Miraglow 1000: metal content 70%; average particle diameter: 30 microns; average thickness: 1 micron; specific surface area: 1.4 $m^2/g$), 2 g of isopropyl alcohol containing 0.1 g of phosphoric acid (1 part by weight on the basis of 100 parts by weight of aluminium pigment) was added, and the resultant mixture was kneaded for 5 minutes for adsorbing phosphoric radical to the surface of the aluminium pigment.

2) To 1 g of commercially available phthalocyanine blue color pigment (fabricated by BASF AG., HELIOGEN BLUE L7072D), 0.5 g of N-β-(aminoethyl)-γ-aminopropyl methyldimethoxysilane (50 parts by weight on the basis of 100 parts by weight of the pigment) and 10 g of mineral spirit were added, and the resultant mixture was subjected to ball milling for 24 hours in a pot mill having a diameter of 5 cm and an inner volume of 300 cc and charged with 200 g of glass beads having a diameter of 1 mm.

3) Into the pot mill containing the color pigment treated as described in step (2), the aluminium pigment adsorbing phosphoric acid obtained in the step (1) and additional 20 g of mineral spirit were introduced and the resultant mixture was subjected to ball milling for another 1 hour. The obtained slurry was washed with 70 g of mineral spirit to separate the glass beads. The resultant slurry was filtered through glass filter by suction to obtain a primary blue colored aluminium pigment. This primary colored aluminium pigment was powdered and the obtained powder was observed under electronic microscope. It was observed that blue color pigment adhered uniformly to each aluminium flake. This primary colored aluminium pigment had pigment loadings of 0.07 g/m 2.

Example 2

1) To 11.4 g (10 g in terms of metal content) of commercially available aluminium pigment (fabricated by Toyo Aluminium K.K., Miraglow 1000), 1 g of polyoxyethylene isooctylphenolether (fabricated by Room & Haas Inc., Triton X-100) was added, and the resultant mixture was dispersed in 100 g of aqueous solution containing 0.1 g of ammonium molybdate (1 part by weight on the basis of 100 parts by weight of aluminium pigment) and stirred for 1 hour at 20° C. for adsorbing molybdic acid radical to the surface of the aluminium pigment. The resultant slurry was introduced into a glass filter and filtrated by vacuum suction to obtain a paste having a metal content of 90%.

2) To 2 g of commercially available transparent iron oxide yellow color pigment (fabricated by BASF AG., SICOTRANS GOLD L1916), 0.1 g of dodecamethylene diamine (10 parts by weight on the basis of 100 parts by weight of the pigment), 0.1 g of benzoic acid, 0.02 g of dispersing agent consisting of dialkoxyaluminium alkylacetoacetate (fabricated by Ajinomoto Co., Inc., Pren Act ALM) and 10 g of mineral spirit were added, and the resultant mixture was subjected to ball milling for 24 hours in a pot mill having a diameter of 5 cm and an inner volume of 300 cc and charged with 200 g of glass beads having a diameter of 1 mm.

3) Into the pot mill containing the color pigment treated as described in step (2), the aluminium pigment adsorbing molybdic acid radical obtained in the step (1), 5 g of ethylene glycol monobutylether and additional 15 g of mineral spirit were added and the resultant mixture was subjected to ball milling for another 1 hour. The obtained slurry was washed with 70 g of mineral spirit to separate the glass beads. The resultant slurry was filtrated through glass filter by suction to obtain a primary gold colored aluminium pigment.

Example 3

Primary red colored aluminium pigment was prepared in a manner similar to that described in Example 1, except that phosphoric acid was replaced by polyphosphoric acid, 0.5 g of N-β-(aminoethyl)-γ-aminopropyl methyldimethoxysilane was replaced by a mixture of 0.1 g of hexamethylenediamine and 0.1 g of anthranilic acid, as well as phthalocyanine blue color pigment was replaced by quinacridone red color pigment (fabricated by CIBA SPECIALTY CHEMICALS K.K., CINQUASIA RED Y RT-759-D). The obtained primary colored aluminium pigment was observed under electronic microscope. It was observed that red color pigment adhered uniformly to each aluminium flake.

Examples 4 to 10 and Comparative Examples 1 to 3

Primary colored aluminium pigments of Examples 4 to 10 and Comparative examples 1 to 3 were prepared in a manner similar to that described in Example 1, except that the compound containing inorganic acid radical and its loadings relative to aluminium pigment were replaced by those indicated in Table 1. Adhering state of the color pigment to the obtained primary colored aluminium pigment is also shown in Table 1. In this Table, the loadings of the compound containing inorganic acid radical are shown in parts by weight on the basis of 100 parts by weight of aluminium pigment and the loadings of the treating agent of color pigment are shown in parts by weight on the basis of 100 parts by weight of color pigment.

TABLE 1 conditions for the preparation of primary colored aluminium pigment

| | compound containing an inorganic acid radical | loading (parts) | treating agent of color pigment | loading (parts) | adhering state of the pigment |
|---|---|---|---|---|---|
| Ex. 4 | phosphoric acid | 0.1 | a | 50 | 4 |
| Ex. 5 | peroxypoly-molybdic acid | 1.0 | b<br>A | 10<br>10 | 5 |
| Ex. 6 | peroxypoly-tungstic acid | 1.0 | c<br>A | 10<br>10 | 5 |
| Ex. 7 | phospho—molybdic acid | 1.0 | c<br>A | 10<br>10 | 5 |
| Ex. 8 | sulfuric acid | 1.0 | c<br>A | 10<br>10 | 4 |
| Ex. 9 | phosphoric acid | 1.0 | d<br>B | 10<br>10 | 5 |
| Ex. 10 | phosphoric acid | 1.0 | — | — | 3 |
| Comp. ex. 1 | — | — | — | — | 1 |
| Comp. ex. 2 | — | — | c | 10 | 2 |
| Comp. ex. 3 | — | — | A | 10 | 1 |

Amino compounds:
a: N-β-(aminoethyl)-γ-aminopropylmethyldimethoxysilane
b: N-β-(aminoethyl)-γ-aminopropyltrimethoxysilane
c: dodecamethylene diamine
d: hexamethylene diamine
Aromatic carboxylic acids:
A: benzoic acid
B: anthranilic acid
Scoring of adhering state of pigment:
5: pigment is adhering closely and uniformly to the whole surface of each flake
4: pigment is adhering to the whole surface of each flake, but non uniformly
3: pigment is adhering to each flake in the state of islands
2: coexistence of flakes adhered by pigment and those not adhered by pigment
1: pigment is not adhering Example 11 to 17

Primary colored aluminium pigments of Examples 11 to 17 were prepared in a manner similar to that described in Example 2, except that the compound containing inorganic acid radical and its loadings relative to aluminium pigment were replaced by those indicated in Table 2. Adhering state of the color pigment to the obtained primary colored aluminium pigment is also shown in Table 2. In this Table, the loadings of the compound containing inorganic acid radical are shown in parts by weight on the basis of 100 parts by weight of aluminium pigment and the loadings of the treating agent of color pigment are shown in parts by weight on the basis of 100 parts by weight of color pigment.

TABLE 2 conditions for the preparation of primary colored aluminium pigment

| | compound containing an inorganic acid radical | loading (parts) | treating agent of color pigment | loading (parts) | adhering state of the pigment |
|---|---|---|---|---|---|
| Ex. 11 | ammonium phosphate | 0.5 | c<br>A | 10<br>10 | 5 |
| Ex. 12 | ammonium vanadate | 1.0 | c<br>C | 10<br>10 | 5 |
| Ex. 13 | ammonium vanadate | 1.0 | d<br>D | 10<br>10 | 5 |
| Ex. 14 | ammonium vanadate | 1.0 | e<br>D | 10<br>10 | 4 |
| Ex. 15 | ammonium vanadate | 1.0 | c<br>E | 10<br>10 | 5 |
| Ex. 16 | ammonium molybdate | 1.0 | — | — | 3 |
| Ex. 17 | nitric acid | 1.0 | c<br>A | 10<br>10 | 4 |

Amino compounds:
c: dodecamethylene diamine
d: 1,8-diaminooctane
e: p-phenylenediamine
Aromatic carboxylic acids:
A: benzoic acid
C: cinnamic acid
D: 2-naphthoic acid
E: salicylic acid
Scoring of adhering state of pigment:
Same as those shown in Table 1

Example 18 to 23

Colored aluminium pigments of Examples 18 to 23 were prepared in a manner similar to that described in Example 2, except that the nature and the loadings of color pigment were replaced by those indicated in Table 3. Adhering state of these color pigments is shown in Table 3. In this Table, the loadings of color pigment are shown in parts by weight on the basis of 100 parts by weight of aluminium pigment.

TABLE 3

Adhering state of each pigment onto aluminium pigment

| | nature of color pigment | loading (parts) | amount of adhered pigment ($g/m^2$) | adhering state of pigment |
|---|---|---|---|---|
| Ex. 18 | phthalocyanine green | 10 | 0.07 | 4 |
| Ex. 19 | diketopyrrolo pyrrole | 20 | 0.14 | 5 |
| Ex. 20 | quinacridone gold | 15 | 0.11 | 5 |
| Ex. 21 | isoindolinone orange | 15 | 0.11 | 5 |
| Ex. 22 | perylene maroon | 20 | 0.14 | 4 |
| Ex. 23 | titanium oxide | 50 | 0.36 | 4 |

Scoring of adhering state of pigment
Same as those shown in Table 1
Nature of color pigments
phthalocyanine green: BASF Japan Limited, HELIOGEN GREEN L 8730
diketopyrrolopyrrole: CIBA SPECIALTY CHEMICALS K.K., IRGAZIN DPP RED BO
quinacridone gold: CIBA SPECIALTY CHEMICALS K.K., CINQUASIA GOLD YT-923-D
perylene maroon: BASF Japan Limited, PALIOGEN MAROON L3920
titanium oxide: Ishihara Sangyo Kaisha, Ltd., Ultrafine titanium oxide TTO

Example 24

To 10 g of slurry containing a primary colored aluminium pigment prepared according to the conditions of Example 1, 0.25 g of methyl methacrylate, 0.25 g of 1,6-hexanediol diacrylate, 0.25 g of styrene and 0.25 g of glycidyl methacrylate (total monomer content was 10 parts by weight on the basis of 100 parts by weight of colored aluminium pigment) were added. The resultant mixture was heated at 80° C. while stirring in an atmosphere of nitrogen gas and added thereto 0.05 g of azobisisobutylonitrile as polymerization initiator. The resultant mixture was allowed to react for 12 hours to polymerize the monomer and the resultant polymer was allowed to precipitate onto the surface of colored aluminium pigment. Thereafter, the slurry was subjected to solid-liquid separation to obtain a paste having a solid content of 50%.

Example 25

To 10 g of slurry containing a primary colored aluminium pigment prepared according to the conditions of Example 2, 0.5 g of epoxidized polybutadiene, 0.5 g of ditrimethylolpropane tetraacrylate, 0.5 g of diethylaminoethyl methacrylate and 0.5 g of vinyl toluene (total monomer content was 20 parts by weight on the basis of 100 parts by weight of colored aluminium pigment) were added. The resultant mixture was heated at 80° C. while stirring in an atmosphere of nitrogen gas and added thereto 0.1 g of azobisisobutylonitrile as polymerization initiator to polymerize the monomer. The resultant polymer was allowed to precipitate onto the surface of colored aluminium pigment. Thereafter, the slurry was subjected to solid-liquid separation to obtain a paste having a solid content of 50%.

Example 26

To 10 g of slurry containing a primary colored aluminium pigment prepared according to the conditions of Example 3, 1.0 g of methyl methacrylate, 1.0 g of trimethylolpropane triacrylate, 1.0 g of butyl acrylate and 1.0 g of divinyl benzene (total monomer content was 40 parts by weight on the basis of 100 parts by weight of colored aluminium pigment) were added. The resultant mixture was heated at 80° C. while stirring in an atmosphere of nitrogen gas and added thereto 0.3 g of benzoyl peroxide as polymerization initiator to polymerize the monomer. The resultant polymer was allowed to precipitate onto the surface of colored aluminium pigment. Thereafter, the slurry was subjected to solid-liquid separation to obtain a paste having a solid content of 50%.

Example 27

To 10 g of slurry containing a primary colored aluminium pigment prepared according to the conditions of Example 11, 0.15 g of acrylic acid, 0.15 g of ditrimethylolpropane tetraacrylate, 0.15 g of glycidyl methacrylate and 0.15 g of styrene (total monomer content was 6 parts by weight on the basis of 100 parts by weight of colored aluminium pigment) were added. The resultant mixture was heated at 80° C. while stirring in an atmosphere of nitrogen gas and added thereto 0.05 g of azobisisobutylonitrile as polymerization initiator to polymerize the monomer. The resultant polymer was allowed to precipitate onto the surface of colored aluminium pigment. Thereafter, the slurry was subjected to solid-liquid separation to obtain a paste having a solid content of 50%.

Example 28

To 10 g of slurry containing a primary colored aluminium pigment prepared according to the conditions of Example 15, 0.2 g of methyl methacrylate, 0.2 g of trimethylolpropane triacrylate, 0.2 g of butyl acrylate and 0.2 g of styrene (total monomer content was 8 parts by weight on the basis of 100 parts by weight of colored aluminium pigment) were added, the resultant mixture was heated at 80° C. while stirring in an atmosphere of nitrogen gas and added thereto 0.05 g of azobisisobutylonitrile as polymerization initiator to polymerize the monomer. The resultant polymer was allowed to precipitate onto the surface of colored aluminium pigment. Thereafter, the slurry was subjected to solid-liquid separation to obtain a paste having a solid content of 60%.

Comparative Example 4

A slurry was prepared by dispersing 10 g (in terms of metal content) of an aluminium pigment (fabricated by Toyo Aluminium K.K., MG1000) and phthalocyanine blue pigment (fabricated by BASF Japan Limited, HELIOGEN BLUE L6900) in 100 ml of mineral spirit. To the resultant slurry, 0.25 g of methyl methacrylate, 0.25 g of 1,6-hexanediol diacrylate, 0.25 g of styrene and 0.25 g of acrylic acid (total monomer content was 10 parts by weight on the basis of 100 parts by weight of colored aluminium pigment) were added. The resultant mixture was heated at 80° C. while stirring in an atmosphere of nitrogen gas and added thereto 0.05 g of azobisisobutylonitrile as polymerization initiator to polymerize the monomer. The resultant polymer was allowed to precipitate onto the surface of colored aluminium pigment. Thereafter, the slurry was subjected to solid-liquid separation to obtain a paste having a solid content of 50%.

Comparative Example 5

To 10 g of slurry containing a primary colored aluminium pigment prepared according to Comparative example 3, 0.3 g of acrylic acid, 0.3 g of ditrimethylolpropane tetraacrylate, 0.3 g of glycidyl methacrylate and 0.3 g of styrene (total monomer content was 12 parts by weight on the basis of 100 parts by weight of colored aluminium pigment) were added. The resultant mixture was heated at 80° C. in an atmosphere of nitrogen gas while stirring in an atmosphere of nitrogen gas and added thereto 0.05 g of azobisisobutylonitrile as polymerization initiator to polymerize the monomer. The resultant polymer was allowed to precipitate onto the surface of colored aluminium pigment. Thereafter, the slurry was subjected to solid-liquid separation to obtain a paste having a solid content of 50%.

Test Example 1

In order to test for the color tone of the colored aluminium pigments prepared in Examples 1 and 24 to 28 as well as Comparative examples 4 and 5, a paint was prepared by using each of the pigments and applied to a plate. As to the resultant coated plate, the chroma and the metallic luster were examined by visual observation and evaluated by to 5-grade scoring.

A paint was prepared by mixing in a homogenizing mixer a colored aluminium pigment and varnish for car refinishing use (fabricated by Nippon Paint Co., Ltd., Auto Clear) in a weight ratio of 10 parts to 100 parts. The obtained paint was applied onto a double-side coated paper by means of a 225 micron (9 mill) doctor blade to obtain a painted plate.

Commercially available colored aluminium pigments were also tested in a similar manner.

Test Example 2

0.3 g of each of colored aluminium pigments of Examples 1 and 24 to 28 as well as Comparative examples 4 and 5 was mixed with 30 g of solvent in a homogenizing mixer and a dispersion was prepared by stirring at 3,200 RPM for 3 minutes. As the solvent, toluene, isopropyl alcohol, ethyl acetate and methyl ethyl ketone were used. After the obtained dispersion was left to stand for 24 hours, the exfoliation of the pigment was evaluated by observation of the supernatant.

Commercially available colored aluminium pigments were also tested in a similar manner.

The results of Tests 1 and 2 are shown in Table 4.

TABLE 4

Color tone and solvent resistance of colored aluminium pigments

| | Color tone | | Solvent resistance | | | |
| --- | --- | --- | --- | --- | --- | --- |
| | chroma | luster | IPA | toluene | MEK | ethyl acetate |
| Ex. 1 | 4 | 5 | Δ | Δ | Δ | Δ |
| Ex. 24 | 4 | 5 | Δ | Δ | ○ | ○ |
| Ex. 25 | 5 | 5 | ○ | ○ | ○ | ○ |
| Ex. 26 | 5 | 4 | ○ | ○ | ○ | ○ |
| Ex. 27 | 5 | 5 | ○ | Δ | ○ | Δ |
| Ex. 28 | 5 | 5 | ○ | ○ | ○ | ○ |
| Comp. Ex. 4 | 2 | 5 | X | Δ | X | X |
| Comp. Ex. 5 | 5 | 5 | Δ | Δ | X | X |
| A* | 3 | 4 | X | ○ | X | X |
| B** | 3 | 4 | X | X | X | X |

Scoring of chroma:
5: excellent
4: good
3: mediocre
2: bad
1: not colored
Scoring of luster:
5: excellent
4: good
3: mediocre
2: bad
1: dull
Scoring of solvent resistance:
○: clear colorless supernatant
Δ: clear light colored supernatant
X: opaque or dark colored supernatant
A* (marketed product): Showa Aluminium Powder K.K., Friend color F500BL
B** (marketed product): Showa Aluminium Powder K.K., Friend color F500RE Example 27

20 g of colored aluminium pigment prepared according to the conditions of Example 25 was sampled. To this sample, 80 g of commercially available water-soluble acrylate polymer varnish (Mitsui Toatsu Chemicals Inc., Alumatex WA-911), 3 g of triethanolamine, 130 g of deionized water and 13 g of water-soluble melamine polymer varnish (Mitsui Toatsu Chemicals Inc., Cymel 350) were added and the resultant mixture was dispersed by means of a disper to prepare a blue metallic base paint. This metallic base paint was applied to a mild steel plate by spray coating and the obtained painted plate was subjected to baking at 140° C. to obtain a blue coating. The obtained coating showed a vivid blue color and has an excellent metallic luster.

50 g of the above metallic base paint was sampled, and the obtained sample was stored at 50° C. for 10 days and tested for the stability. Hardly any gas evolution was observed and neither viscosity increase nor aggregation was found.

Comparative Example 6

An aqueous metallic base pigment was prepared in a manner similar to Example 27, except that the pigment was replaced by 14.3 g of aluminium pigment (solid content of 70%) prepared under the conditions of Comparative example 4. Then, a metallic coating was carried out in a similar manner. The obtained coating had an inferior color brightness as compared to the coating obtained in Example 27.

50 g of this metallic base paint was sampled, stored at 50° C. for 10 days and observed the change. It was observed that more than 20 cc of hydrogen gas evolved and the aggregate was formed as a result of the reaction of aluminium pigment contained in the paint.

Example 28

3 g (in terms of aluminium content) of colored metallic pigment prepared in Example 25 was sampled, blended with 100 g of polyethylene polymer and produced to a molded article by injection molding. The obtained molded article exhibited a vivid blue metallic appearance.

Comparative Example 7

A molded article was produced in a manner similar to that of Example 23, except that aluminium pigment was replaced by the aluminium pigment prepared in Comparative example 2. The obtained molded article had a metallic appearance, but didn't exhibit very vivid color.

What we claim:

1. A colored aluminum pigment having on the surface thereof
   an adsorption layer of an inorganic acid radical, wherein said acid radical is at least one selected from the group consisting of acid radical of carbonic acid, boric acid, sulfuric acid, nitric acid, phosphoric acid, polyphosphoric acid, phosphorus acid, hypophosphorous acid, silicic acid, chromic acid, molybdic acid, phosphomolybdic acid, polymolybdic acid, tungstic acid, phosphotungstic acid, polytungstic acid, titanic acid, vanadic acid, tantalic acid and condensates thereof; and
   a color pigment layer adhered to said adsorption layer, wherein said color pigment is at least one selected from the group consisting of phthalocyanine, halogenated phthalocyanine, quinacridone, diketopyrrolopyrrole, isoindolinone, azomethine metallic complex, indanthrone, perylene, perynone, anthraquinone, dioxazine, benzoimidazolone, condensed azo, triphenylmethane, quinophthalone, anthrapyrimidine, ultramarine blue, iron blue, cobalt blue and chrome oxide green, and wherein said color pigment is coated with an amino compound containing 2 amino groups and no carboxylic group therein.

2. The colored aluminum pigment as claimed in claim 1, wherein said inorganic acid radical is at least one selected from the group consisting of acid radical of pyrophosphoric acid, polyphosphoric acid, polymolybdic acid, polytungstic acid, phosphomolybdic acid and phosphotungstic acid.

3. The colored aluminum pigment as claimed in claim 1 or 2, wherein said color pigment is further coated with a monobasic aromatic carboxylic acid.

4. The colored aluminum pigment as claimed in claim 1 or 2, wherein a surface of the color pigment layer is coated with a polymer derived from a polymerizable monomer.

5. A resin composition containing a resin and 0.1 to 30% by weight of colored aluminum pigment of claim 1 or 2.

6. A process for preparing a colored aluminum pigment, comprising the steps of:
   (a) mixing a solution containing an inorganic acid radical with an aluminum pigment to make said aluminum pigment adsorb said inorganic acid radical on the surface thereof;

(b) adding the resultant aluminum pigment to a dispersion of color pigment in a nonpolar solvent while stirring, wherein said inorganic acid radical is selected from the group consisting of acid radical of carbonic acid, boric acid, sulfuric acid, nitric acid, phosphoric acid, polyphosphoric acid, phosphorus acid, hypophosphorous acid, silicic acid, chromic acid, molybdic acid, phosphomolybdic acid, polymolybdic acid, tungstic acid, phosphotungstic acid, polytungstic acid, titanic acid, vanadic acid, tantalic acid and condensates thereof;

wherein said color pigment is at least one selected from the group consisting of phthalocyanine, halogenated phthalocyanine, quinacridone, diketopyrrolopyrrole, isoindolinone, azomethine metallic complex, indanthrone, perylene, perynone, anthraquinone, dioxazine, benzoimidazolone, condensed azo, triphenylmethane, quinophthalone, anthrapyrimidine, ultramarine blue, iron blue, cobalt blue and chrome oxide green, and wherein said dispersion of color pigment in a nonpolar solvent is prepared by treating said color pigment in the presence of an amino compound having 2 amino groups and no carboxylic group therein or in the presence of said amino compound and a monobasic aromatic carboxylic acid.

7. The process as claimed in claim 6, wherein said process comprises the steps of:

adding to a colored aluminum pigment dispersed in an organic solvent a polymerizable monomer and a polymerization initiator;

stirring a resultant mixture under heating to induce the polymerization of said polymerizable monomer; and allowing a resultant polymer to precipitate on the surface of said colored aluminum pigment.

8. A colored aluminum pigment produced by the process of claim 6.

* * * * *